Nov. 13, 1934.  B. BIGLER  1,980,742
PIPE CASTING APPARATUS
Filed March 27, 1933
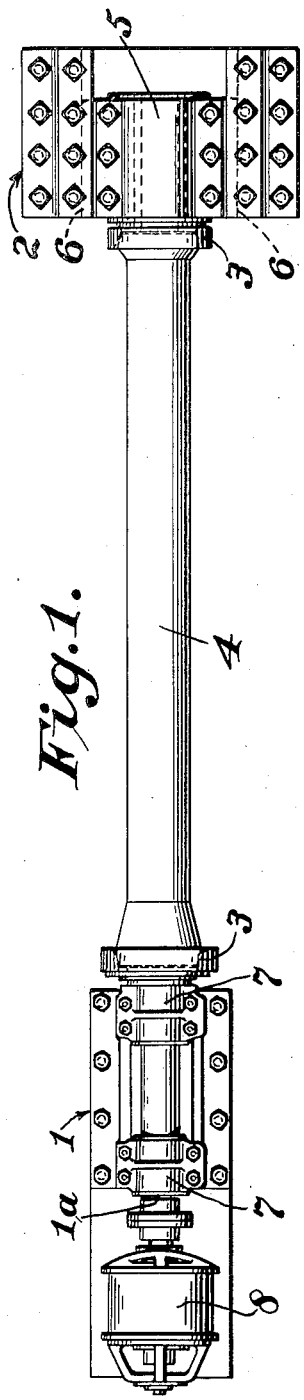
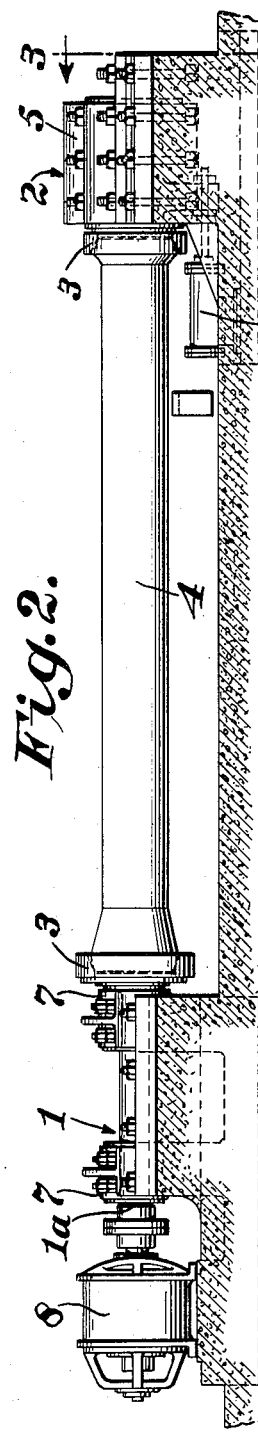
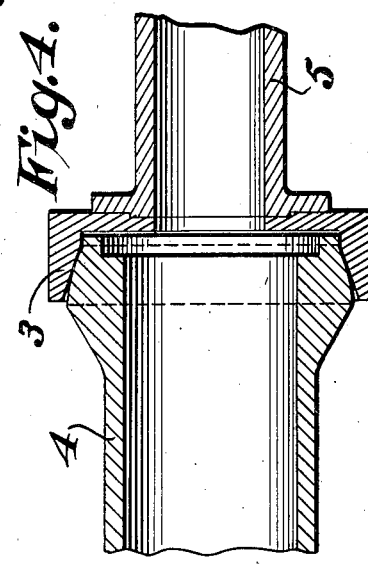
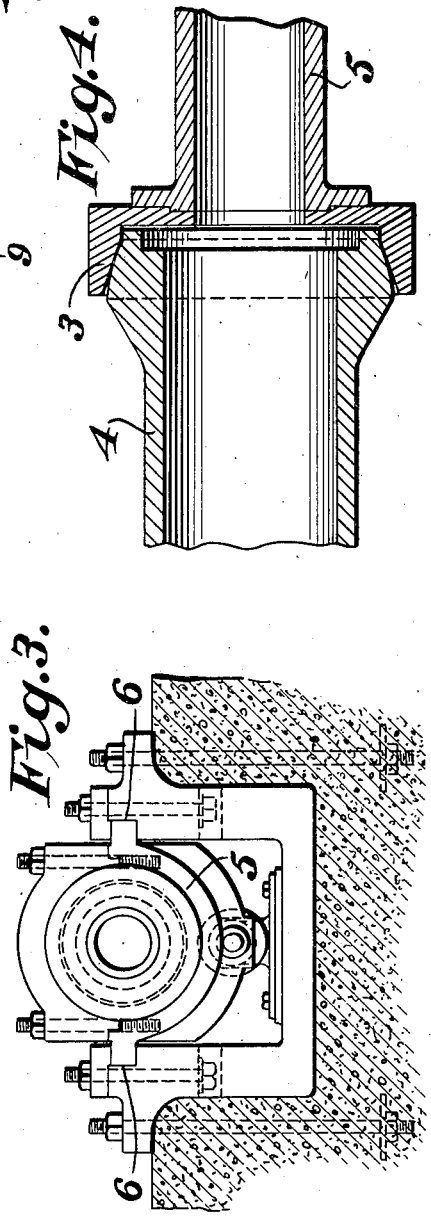
Inventor:
Bernhard Bigler,
By Spear, Donaldson & Hall
Attorneys.

Patented Nov. 13, 1934

1,980,742

UNITED STATES PATENT OFFICE 1,980,742

PIPE CASTING APPARATUS

Bernhard Bigler, Phillipsburg, N. J.; Esther Henningsen Bigler executrix of said Bernhard Bigler, deceased Application March 27, 1933, Serial No. 663,013

4 Claims. (Cl. 22—65)

The invention is intended to provide apparatus for centrifugally casting iron pipe in a sand lined mold, or flask, which is supported between clutches designed in connection with the ends of the flask to provide a universal joint at the end of said flask for supporting the flask and for compensating for any axial misalignment of the shafts carrying the clutches in respect to each other. Another object of the invention is to avoid the use of roller or other forms of bearings at a point, or points, intermediate the ends of the flask so that the entire supporting, or suspension, function will be performed by the universal joint afforded by the clutches and the ends of the flask.

In the accompanying drawing

Figure 1 is a plan view of the apparatus with the flask in place and held by the clutches.

Fig. 2 is a side view of Fig. 1.

Fig. 3 is a cross section of Fig. 2 on line 3—3.

Fig. 4 is a sectional view of one of the clutches and a portion of end of the flask.

The machine consists of two separate parts, the bell, or drive end, 1, and the bead, or pouring end, 2.

Each end consists of a bed plate with bearings supporting a shaft onto which is attached a cone shaped friction clutch 3. The clutches face each other and the shafts are mounted along the same center line. Between the clutches and held by them in a horizontal position is the flask, or mold, 4.

The clutch at the bead end is movable along the center line of its shaft for the purpose of making room to insert the flask into the machine or expel it from the machine. This motion of the clutch is produced by its carriage 5 being propelled between guides 6 as shown on the drawing, said motion being accomplished by mechanical, hydraulic, electric or other means, such, for instance, as is shown generally at 9.

The clutch at the drive end is held in two bearings 7, 7, the end of the shaft 1a opposite the clutch being coupled to a motor 8, which is mounted on the same bed plate as the shaft bearings.

The flask ends and the clutches are shaped or equipped in such a manner that there will be a slight ball-joint effect between them, an example of one of the many ways of doing this being shown on the drawing. While the ball joint effect as applied to the connection between the flask and the clutch is one of the essential features of my machine, there are many different ways of making a ball joint, and I do not desire to limit myself in this connection. The flexibility of a ball joint will permit a certain amount of deflection of the flask and make it possible to rotate or "spin" the flask at high speed, even though the two ends of the machine should not be in perfect alignment.

This ability of the machine to work without being in perfect alignment is one of the important features of my invention.

Thus the flask is suspended at its ends only and at two points, making a perfect and self-aligning method of being suspended.

By suitable means, the flask is brought into position with its center line nearly in line with the center line of the clutch shafts.

At this time the bead-end carriage is in a position furthest away from the bell end of the machine.

Then the bead end carriage is moved towards the flask by power, thereby centering the flask and holding it securely between the clutches.

The motor is started up, imparting a rotating motion to the flask, whereafter the iron is poured into the bead end of the mold in the usual or other suitable manner. After the pipe has been formed and the iron is frozen, the carriage at the bead end is drawn back, releasing the flask onto a pair of skids, which in the meantime have been raised to contact with the flask.

Then the flask is removed from the skids and the cycle of operation repeated.

There is a positive grip between the flask ends and the clutches so that the torque from the motor will be transmitted to the flask at one end thereof positively and without slipping.

There will be practically no wear between the contacting surfaces of the clutches and flask ends because the movable carriage at the bead end of the flask will press its supported clutch into positive contact with the partly globular bead end of the flask and maintain a firm contact between these parts. There will be no hammering, or jarring, action of the flask which occurs when driving rollers, contacting with the exterior of the flask, are employed. The apparatus is self-aligned because of the cone shaped clutches contacting with the partly globular, or curved, or ball shaped flask ends. No realigning adjustments will be required because the universal joints between the clutches and the ends of the flask will take care of any slight misalignment owing to the fact that the flask always will be suspended between the centers of the clutches. The machine will be free from excessive vibration, or shocks, tending to disturb the smooth inner surface of the pipe being formed within the flask. The flask may be made at minimum cost requiring no turned roller parts, nor machined guide collar, or other highly finished parts.

All shaft bearings are definitely smaller than the diameter of the flask. This is important as the workability of the machine depends upon its bearings, and no bearings are made that will be usable at the high speeds required, with a diameter much in excess of those disclosed by me.

The clutch at the bell end is of a diameter greater than the diameter of the flask (as great as the outside of the bell) engaging the flask along a greatly extending periphery, thus affording a positive, non-slipping grip of the flask without the use of any keys which it will take time to center when inserting the flask, and which will be subject to wear.

A clutch which engages a solid and permanent part of the flask and not a removable core plate, which core plate would be subject to warping after the first heat, and which core plate because of its warping, and because it has to be interchanged with another after the casting of each pipe, will not afford a concentric or even or uniform rotation of the flask. It is to avoid the grave difficulties of uneven running or rotation of the flask that I have provided a grip on the flask proper even at the expense of a much larger, heavier and costlier clutch. This condition just described will also make it possible to use core plates of much lighter weight, and this is equally important as two core plates have to be handled and rehandled several times for each pipe cast.

The rotation of the flask will, on account of its flexible end connections show no hammering, and will be free from the excessive vibrations and shocks which will occur when end connections are not flexible. The flexible end connections combined with the lack of intermediate supports will produce that smooth and even running or rotation, the attainment of which long has been the desire of pipe foundrymen.

I claim:

1. In apparatus for casting pipe and the like a flask, means at each end of said flask for supporting the same, said means having a compensating engagement with the ends of said flask to provide for axial misalignment of said supporting means, and means for imparting rotary motion to one of said supporting means, the other supporting means being capable of rotary motion with the flask, substantially as described.

2. In apparatus of the class described, a flask, means for supporting the same at its ends, having a universal joint engagement therewith, and means for imparting rotary movement to the flask and the supporting means, the universal engagement of the supporting means with the flask providing for axial misalignment of one supporting means in relation to the other, substantially as described.

3. In combination a flask, a rotary clutch at each end of the flask having universal joint engagement therewith, shafts connected with the clutches, each shaft being mounted in a bearing to rotate therein, a motor connected with one of the shafts, and an adjustable support for the clutch and shaft at the opposite end of the flask so that the flask can be removed or replaced, substantially as described.

4. In combination a flask having its ends rounded externally, a clutch to engage the rounded ends of the flask to provide for a universal automatic adjustment of the flask in relation to the clutches, said clutches being substantially axially in line with each other, a motor for driving one of the clutches, and an adjustable carrier for supporting the other clutch, substantially as described.

BERNHARD BIGLER.